(12) United States Patent  (10) Patent No.: US 6,978,233 B1
Burns  (45) Date of Patent: Dec. 20, 2005

(54) METHOD FOR EMULATING MULTI-PROCESSOR ENVIRONMENT

(75) Inventor: John J. Burns, Bountiful, UT (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/518,328

(22) Filed: Mar. 3, 2000

(51) Int. Cl.$^7$ ............... G06F 9/455; G06F 15/00
(52) U.S. Cl. ............ 703/27; 703/23; 703/21; 712/208; 712/213; 712/227; 712/41
(58) Field of Search .............. 703/21, 27, 23; 717/134, 135, 138; 712/41, 208, 209, 213, 712/227

(56) References Cited

U.S. PATENT DOCUMENTS

| | | | | |
|---|---|---|---|---|
| 4,325,120 A | * | 4/1982 | Colley et al. | 711/202 |
| 4,855,905 A | * | 8/1989 | Estrada et al. | 709/246 |
| 5,051,888 A | * | 9/1991 | Hansen et al. | 703/23 |
| 5,311,524 A | | 5/1994 | Carlson et al. | 371/70 |
| 5,313,614 A | * | 5/1994 | Goettelmann et al. | 717/138 |
| 5,379,432 A | * | 1/1995 | Orton et al. | 709/315 |
| 5,574,927 A | * | 11/1996 | Scantlin | 712/41 |
| 5,781,750 A | * | 7/1998 | Blomgren et al. | 712/209 |
| 5,784,640 A | * | 7/1998 | Asghar et al. | 712/35 |
| 5,794,011 A | | 8/1998 | Paul et al. | 395/500 |
| 5,794,063 A | * | 8/1998 | Favor | 712/23 |
| 5,826,089 A | * | 10/1998 | Ireton | 717/146 |
| 5,838,948 A | * | 11/1998 | Bunza | 703/27 |
| 5,907,708 A | * | 5/1999 | Hohensee et al. | 712/244 |
| 5,925,114 A | * | 7/1999 | Hoang | 710/48 |
| 5,925,124 A | * | 7/1999 | Hilgendorf et al. | 712/227 |
| 6,075,937 A | * | 6/2000 | Scalzi et al. | 703/23 |
| 6,230,119 B1 | * | 5/2001 | Mitchell | 703/27 |
| 6,438,679 B1 | * | 8/2002 | Sollars | 712/208 |
| 6,571,206 B1 | * | 5/2003 | Casano et al. | 703/25 |

* cited by examiner

*Primary Examiner*—W. Thomson
*Assistant Examiner*—Dwin M. Craig
(74) *Attorney, Agent, or Firm*—Mark T. Starr; Charles A. Johnson; Nawrocki, Rooney & Sivertson, PA (57) ABSTRACT

A method of and an apparatus for performing efficient software emulation of a multi-processor target computer by a host computer. The software technique permits multiple processors to be emulated by a single processor. The use of software emulation permits the host computer to execute both host programs and target programs. The software emulation is made particularly efficient by utilizing the operation code combined with a separate four bit field to directly address the corresponding host instructions.

18 Claims, 9 Drawing Sheets

Prior Art

Prior Art

METHOD FOR EMULATING MULTI-PROCESSOR ENVIRONMENT

CROSS REFERENCE TO CO-PENDING APPLICATIONS

The present application is related to co-pending patent application Ser. No. 09/518,327 filed Mar. 3, 2000 entitled "A Method of Dispatching Target Instructions Using C Code", assigned to the assignee of the present invention and incorporated herein by reference.

BACKGROUND OF THE INVENTION

1. Field of the Invention

The present invention generally relates to digital data processing systems, and more particularly relates to emulation of a first device through the use of a second and different type of device.

2. Description of the Prior Art

It is well known in the prior art to design and build general purpose instruction processors having a predefined software architecture and instruction set. It is also known to design and build instruction processors having predefined software architectures and instruction sets which are more specialized in nature. Such specialized designs are typically directed toward optimization of a particular task or a closely related group of tasks.

One of the tasks to which a specialized design is particularly pertinent is in the field of real time communications processing. Whereas this application does not require complex arithmetic and mathematical calculations, for example, it does require rapid switching of data and control. It also relies upon rapid transfer of data from one location to another. As a result, a communications instruction processor typically has extensive switching, timing, and data transfer instruction, with only modest attention to complex mathematics, such as floating point arithmetic. In a typical implementation, this means that the communications processor would have a modest set of general purpose instructions (e.g., add, shift, compare, etc.) along with a number of specialized instructions for queue manipulation, segment handling, buffer allocation, etc.

Perhaps the best example of a communications instruction processor having an especially effective design is the Distributed Communications Processor (DCP) available from Unisys Corporation. The DCP instruction processor is found in many systems in use today. The unique software architecture which provides the efficiencies for this specialized application provides difficulty in upgrading to newer and faster hardware.

It is normal to expect that newer and faster instruction processors are continuously being designed and built. Yet for economic reasons of scale, these designs typically have a more generalized software architecture to promote a larger volume of applications over which to amortize the non-recurring development costs. Thus, to benefit from these newer instruction processors, the existing DCP communications software would need to be reprogrammed to operate within the more generalized software architecture of the new instruction processor.

Such reprogramming has two major disadvantages. First, the cost of the reprogramming process may be substantial and occupy a rather extensive development schedule. Second, programming of the communications software to operate within a more generalized architecture does away with the efficiencies to be realized by the more specialized communications architecture.

The typical answer to this dilemma is emulation. Emulation is the process whereby the host machine (in this case a new instruction processor design having a somewhat generalized software architecture) is programmed to provide the more specialized software architecture of the target machine (in this case the DCP). Using this technique, the existing DCP communications software can run on a newer instruction processor with an apparently incompatible software architecture. U.S. Pat. No. 5,794,011, issued to Paul et al., discusses the technique of emulation.

Thus, emulation most easily resolves the first of the problems by eliminating the expense and long development schedule involved in reprogramming. However, the question of runtime efficiencies is always present when emulation techniques are employed. Unless the specific emulation system is optimized for efficiency, the new and faster host instruction processor may actually executed the desired software more slowly than the older specialized target processor. The easiest way to provide efficient emulation is to provide the emulation logic in microcode. As such, the host machine becomes the target machine via the microprogramming. Unfortunately, this directly changes the host environment to look like the target environment. As a result, the host machine loses its character and can no longer execute code specifically designed for its native environment.

In order to provide an emulation wherein the host machine presents both the target environment and its native environment, it is common for prior art emulation techniques to perform a runtime software comparison within the host machine to locate those host machine instructions required to implement a particular target instruction. For emulation of the DCP, this would require an average of about 150 comparisons per specialized target instruction to be emulated. This would render a hopelessly inefficient emulation.

Of particular difficulty is the emulation of a multi-processor target environment. This difficulty is exacerbated when utilizing a single processor host.

SUMMARY OF THE INVENTION

The present invention overcomes many of the disadvantages found in the prior art by providing a method of and apparatus for software emulation of a multi-processor target on a single processor host machine while continuing to provide the native host environment. Unlike prior art systems which utilize comparisons to select the host instructions required to emulate a particular specialized target instruction, the present invention uses the target instruction as a direct pointer to locate the necessary host instructions.

In accordance with the preferred mode of the present invention, a Pentium microprocessor chip, available from Intel Corporation, is used as the host for emulating the Distributed Communications Processor (DCP), available from Unisys Corporation. The invention utilizes a fast index to the target instruction code used by the processor object. An array of procedures is defined in the application within a header file. Each array is defined as a pointer. The pointer is initially void. The real values are filled in by the constructor of the processor object during the initialization of the processor. Using this array, the processor flow is directed to the single instruction using the op code and an additional four bit field as a direct index to the routine.

When a target instruction is processed by the processor object, it is immediately dispatched using the op code as an index into an array of target instruction pointers. This is an efficient alternative to running a string of comparisons between the op codes and target instructions.

This immediate dispatch of the processor object means that the target instruction is promptly emulated without the time consuming comparison found in the prior art. Thus, the run time execution of the emulator becomes substantially faster and more efficient.

A separate object is utilized for each processor to be emulated. Thus, in emulating a multi-processor environment, a plurality of objects are used wherein each object corresponds to a different target processor. Emulation of a multi-processor target environment by a single processor provides significant flexibility in implementing the emulation system. Obviously, this permits the total multi-processor emulation to be accomplished in a single processor system. Furthermore, in multi-processor host systems, the multi-processor target may be emulated from a single or less than all of the host processors which oftentimes gives a much more efficient division of labor amongst processors.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
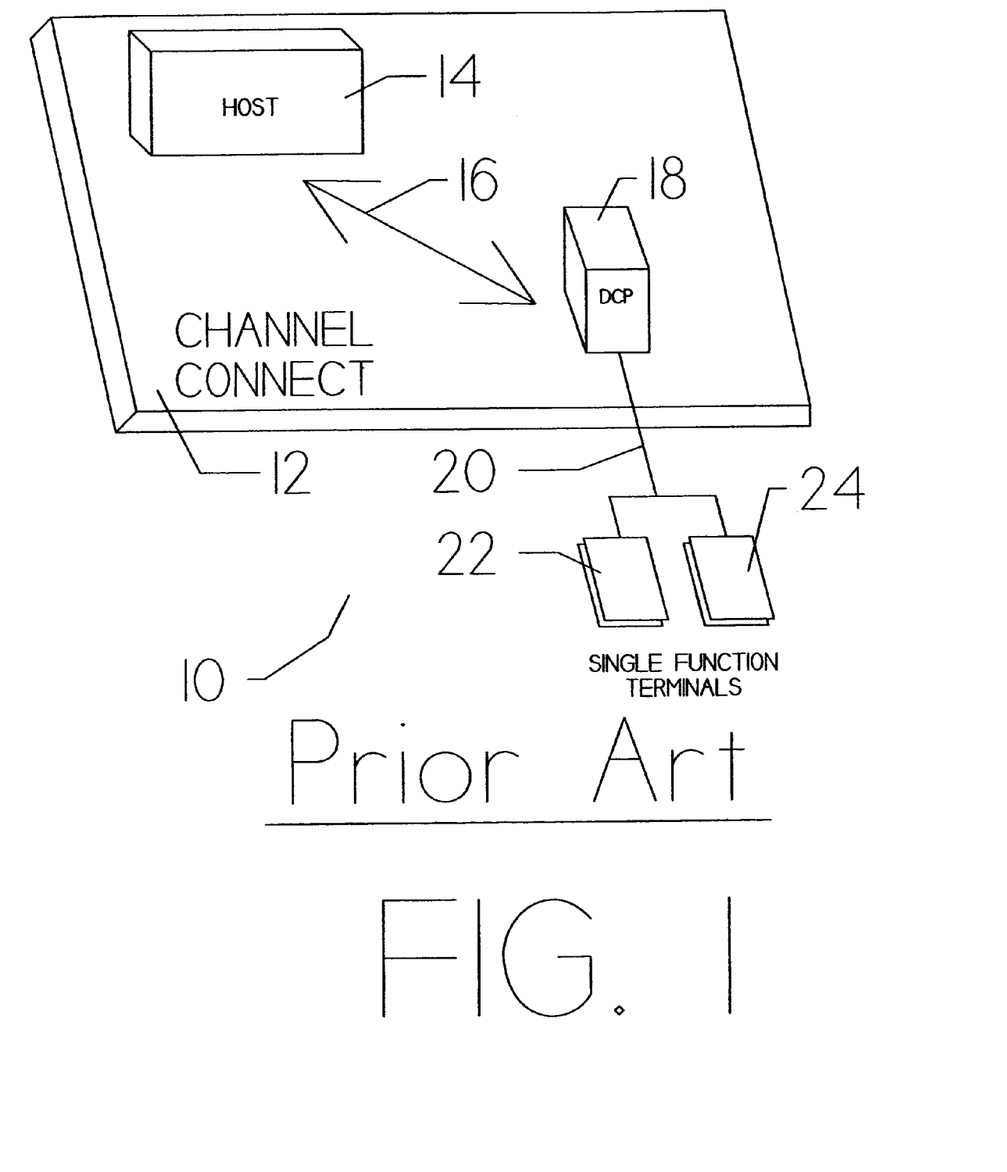
FIG. 1 is a conceptual diagram of a typical legacy environment employing the DCP.

FIG. 1 is a conceptualized diagram showing a legacy system 10 employing the DCP. This basic legacy system is typical of installed data management systems of various enterprises of differing sizes. Channel connect 12 represents the direct coupling of Host 14 to DCP 18 via cable 16. In the normal situation, Channel connect 12 shows that Host 14 and DCP 18 are physically collocated. In this installation, DCP 18 functions as a data concentrator and interface to single function terminals 22 and 24. These single function terminals are not collocated with the other components of legacy system 10 but are coupled via dedicated link 20, as shown. Use of DCP 18 in this way permits modification and upgrade of single function terminals 22 and 24, along with dedicated link 20, without impact on host 14 and its contained legacy software base.

Figure 2:
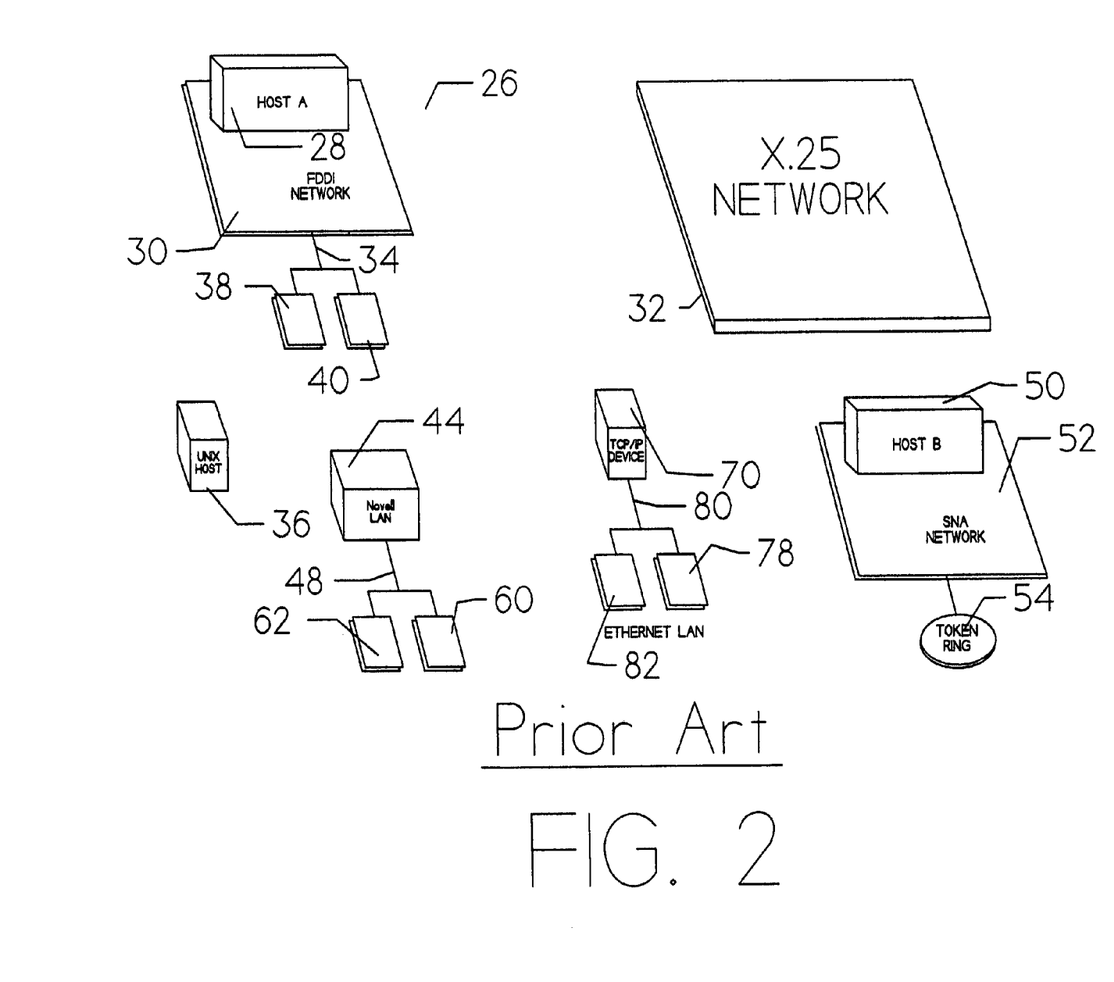
FIG. 2 is a conceptual diagram of modern network architectures.

FIG. 2 is a conceptualized diagram 26 of the various components of modern network architectures. Host A 28 is representative of a typical Unisys Model 2200 host configuration currently available from Unisys Corporation. Fiber network, FDDI Network 30, couples the various components which are not physically collocated with Host A 28. Remote components 38 and 40, coupled via path 34, may be a combination of single function terminals, "intelligent" terminals, other computers, data concentrators, servers, etc.

Unix Host 36 is shown as a component providing a different applications environment. X.25 Network 32 is shown as a component providing a different networking protocol. Novell LAN 44, shows a local area network which couples industry compatible, personal computers 60 and 62. This configuration may be found in the typical small office.

Host B 50 is typically a legacy host available from IBM Corporation. It couples with SNA Network 52 to Token Ring 54. Multiple personal computers, servers, and concentrators may be coupled to and serviced by Token Ring 54. TCP/IP Device 42 shows yet another networking protocol in servicing components 56 and 58 via path 46. Components 56 and 58 may be terminals, computers, servers, etc.

The challenge in integrating these various networks and systems is that which is addressed by the Distributed Communication Processor (DCP) available from Unisys Corporation. This challenge is met through the use of an architecture having a hybrid instruction set with both general purpose and special purpose instructions.

Figure 3:
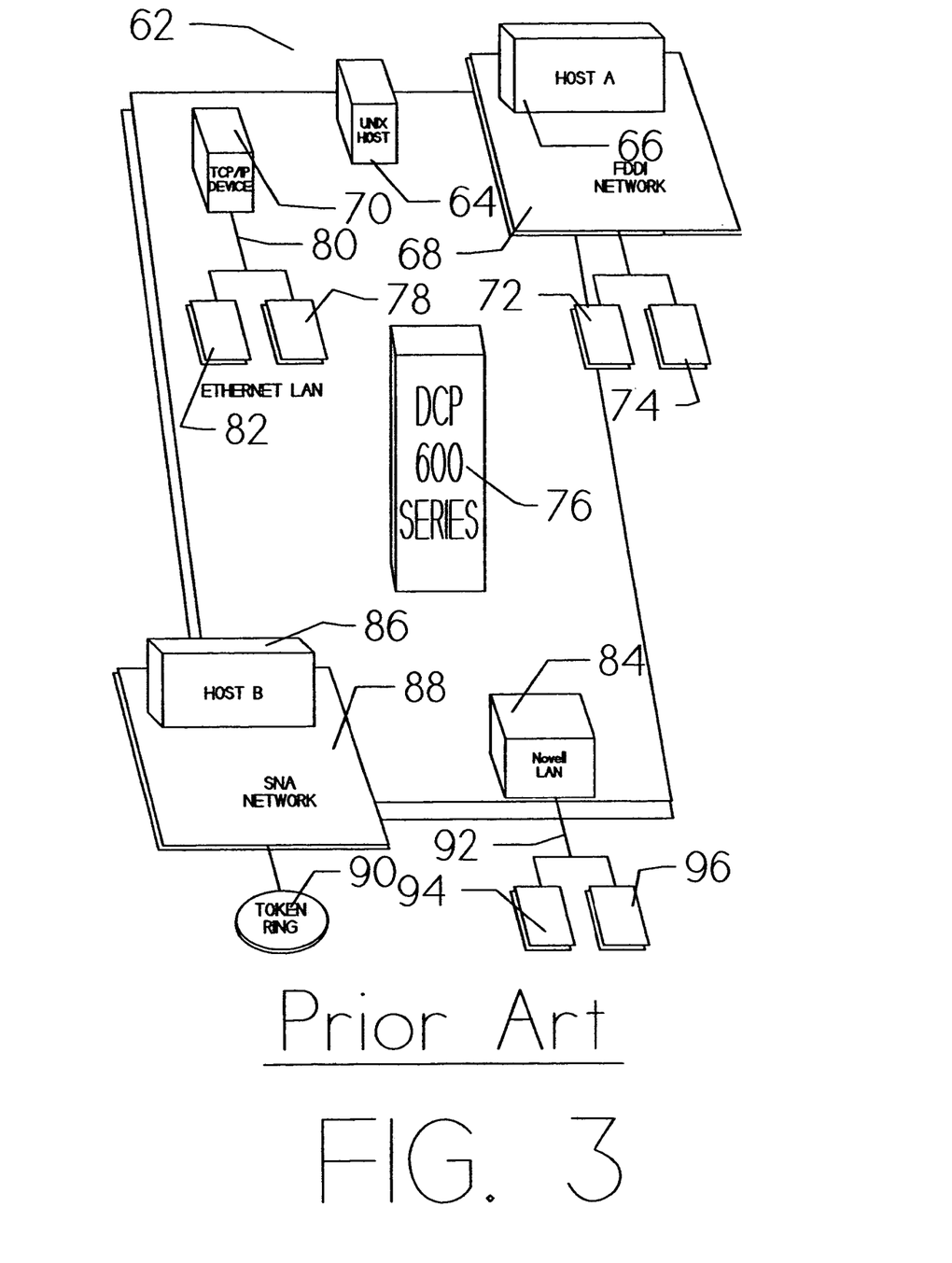
FIG. 3 is a conceptual diagram of a modern network integrated with the DCP.

FIG. 3 is a conceptualized diagram 62 showing integration of diverse networks and systems through utilization of the DCP technology. The heart of this integrated system is DCP 600 Series 76, as shown. It couples to the remaining system components via the native communication protocol of each. Thus, each of the system components is functionally interconnected without the need to appreciably modify any of these components to accommodate the differing communication protocols utilized by the other system components.

For example, TCP/IP Device 70 communicates with DCP 76 in accordance with its defined protocol. That permits Ethernet LAN devices 78 and 82, coupled to TCP/IP Device 70 via Ethernet LAN 80, to communicate with DCP 76 and therefore with any device coupled to DCP 76. Similarly, UNIX Host 64 communicates with DCP 76 according to its communication protocol.

In like manner, Host A 66, typically a Model 2200 system available from Unisys Corporation, is functionally coupled to DCP 76. Thus, devices 72 and 74, coupled to Host A 66 via FDDI Network 68, can readily communicate with UNIX Host 64, TCP/IP Device 70, and all devices coupled to DCP 76. In addition, Host B 86, typically and IBM mainframe, along with its SNA Network 88 and Token Ring 90, communicate with DCP 66 in its preferred protocol. And Novell LAN 84, along with LAN devices 94 and 96, communicate with DCP 66 as if it were a Novell LAN device.

Figure 4:
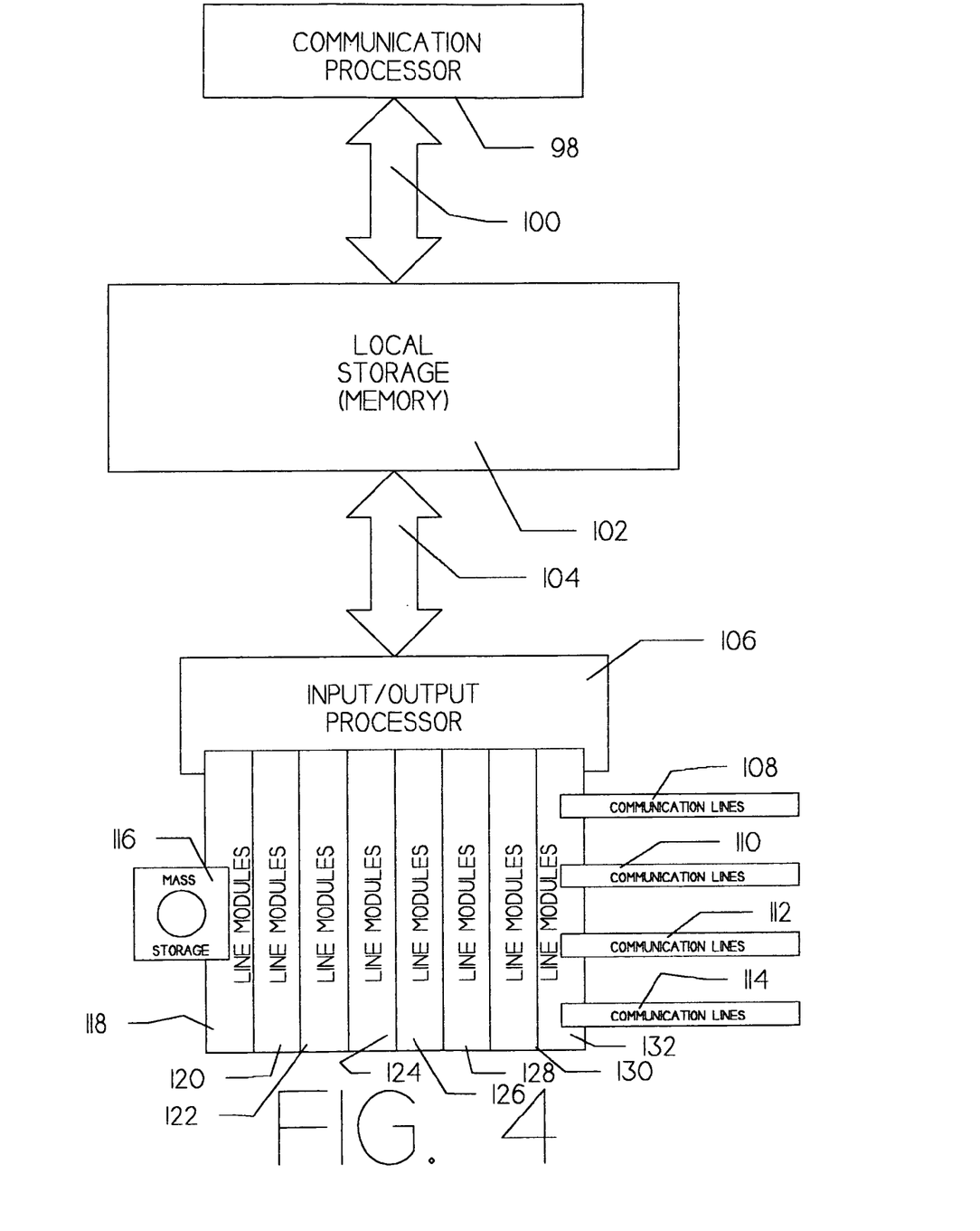
FIG. 4 is a diagram showing the basic DCP architecture.

FIG. 4 is a block diagram of the basic DCP hardware architecture. Communication Processor 98 is the primary instruction processor of the DCP system. It is this element which is emulated in accordance with the present invention as described in detail below.

Communication Processor 98 is coupled to Local Storage 102 via bi-directional memory bus 100, as shown. Similarly, bi-directional memory bus 104 couples Local Storage 102 to Input/Output Processor 106. Line Modules 118, 120, 122, 124, 126, 128, 130, and 132 provide the individualized electrical and functional interface to the various diverse networks within the system (see also FIG. 3). Mass Storage 116 provides the required large storage capacity. Communication lines 108, 110, 112, and 114 couple directly to various diverse components of the integrated system.

Figure 5:
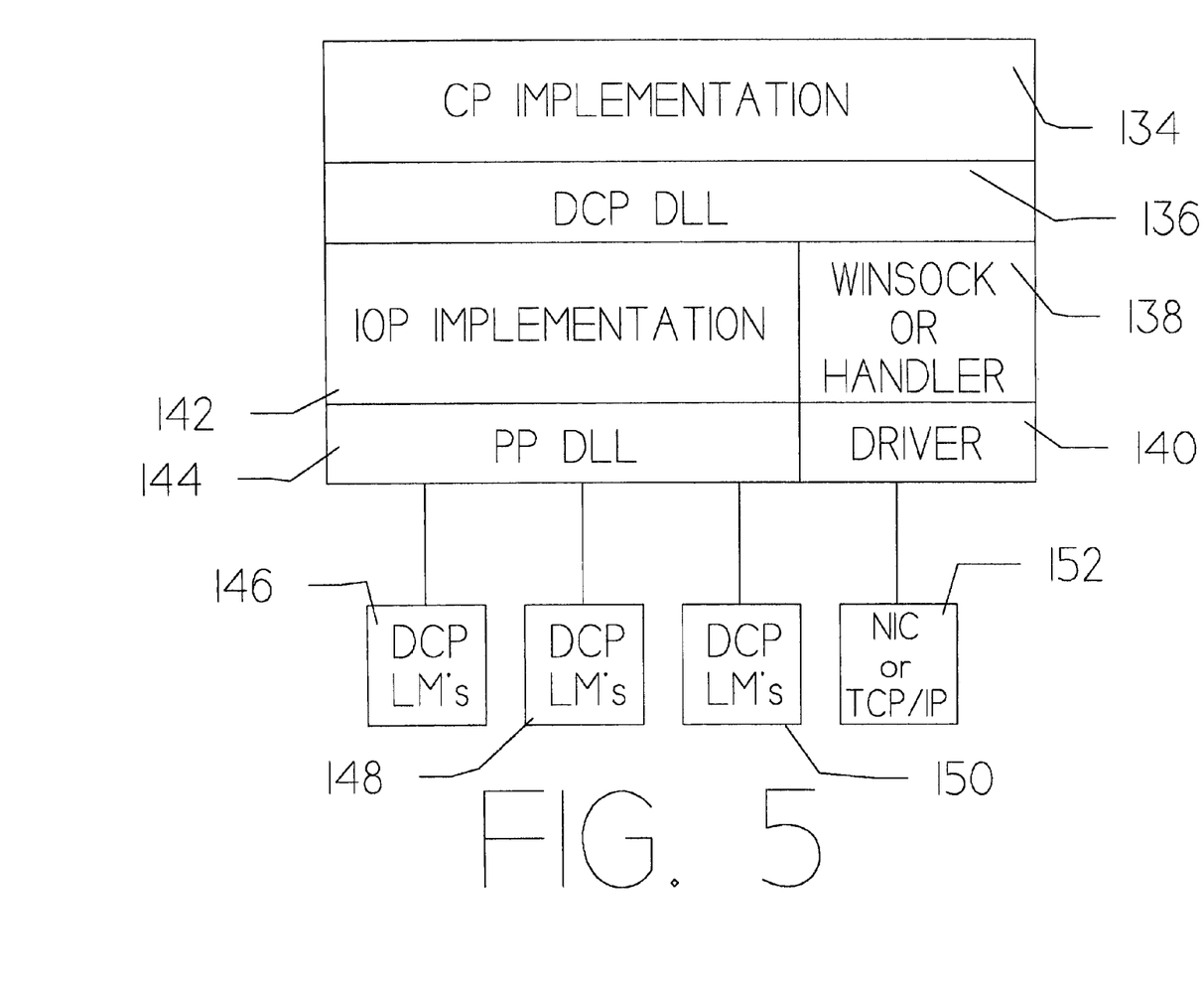
FIG. 5 is a diagram showing an application implementing the DCP system

FIG. 5 is a block diagram of the application implementation of the emulated DCP system. In accordance with the preferred mode of practicing the present invention, a COM32 microprocessor, available from Intel Corporation, is utilized as the host processor. The preferred programming language is C++. The applications run under the Windows NT operating system. This configuration permits direct use of such software as Telcon, thus directly providing a number of the diverse system interfaces.

CP Implementation 134 is the application associated with emulation of the DCP architecture. DCP DLL 136 provides the instruction sequences as discussed in detail below. The DCP input/output control is performed by IOP Implementation 142, with PP DLL 144 providing the coding sequences. DCP Line Modules 146, 148, and 150 are thus DCP style interfaces coupling to a number of diverse components employing a variety of network protocol standards.

Winsock or Handler 138 provide the opportunity to interface directly from the Host (i.e., Intel) Native environment under Windows NT control to system components communicating with compatible interfaces. Driver 140 is typically a Windows NT Driver. NIC or TCP/IP 152 couples directly to compatible communication links.

Figure 6:
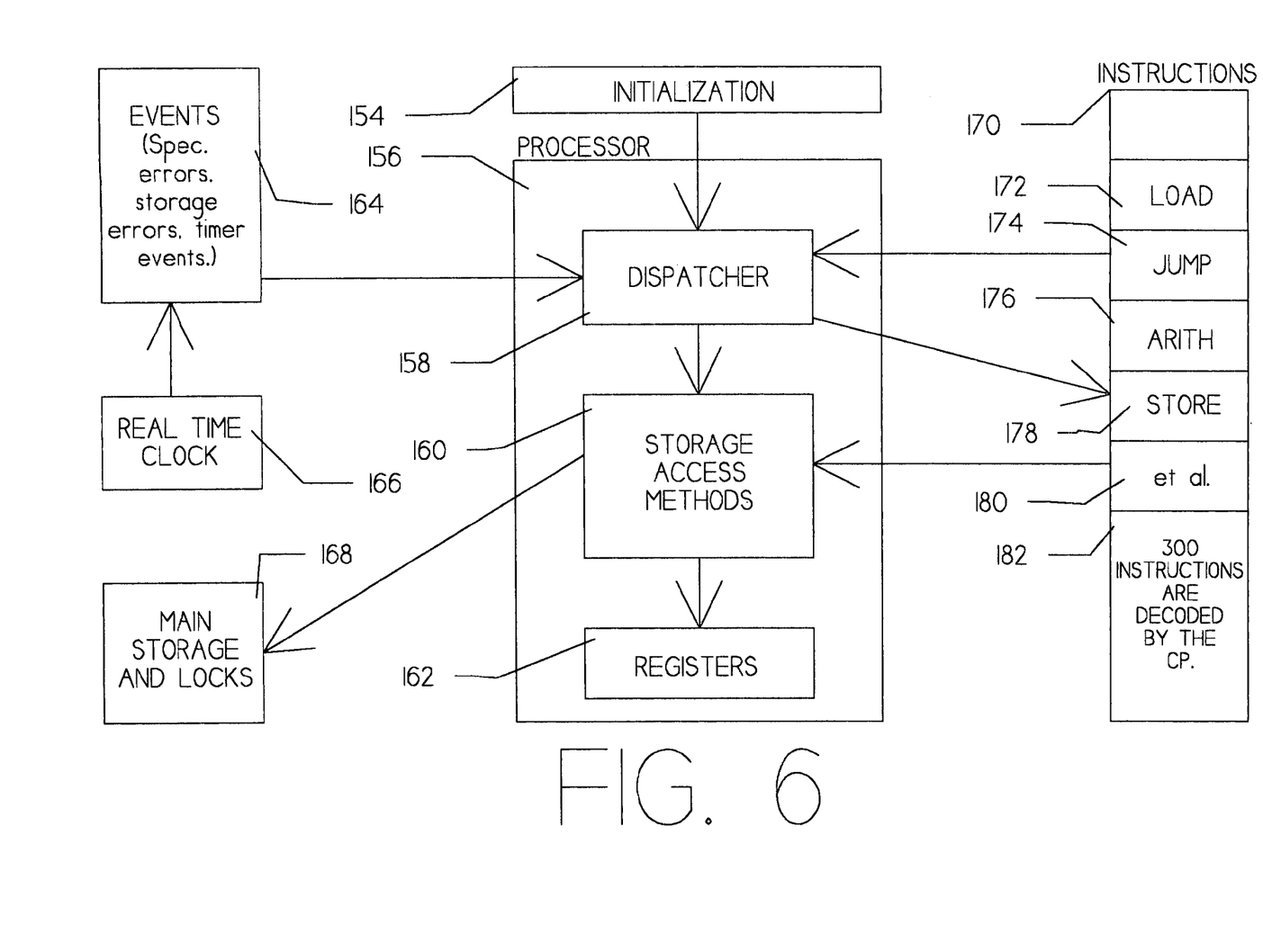
FIG. 6 is a an illustration of the operation of the DCP.

FIG. 6 is a detailed diagram showing the communications processor applications of the preferred emulation technique of the present invention. Initialization 154 is utilized to preset operating conditions. Processor 156 contains Dispatcher 158, Storage Access Methods 160, and Registers 162.

Instructions 170 contains the host instructions required to implement a particular target instruction. Typical instructions include Load 172, Jump 174, Arithmetic 176, Store 178, additional instructions 180, and 300 additional instructions 182. Dispatcher makes the selection as shown and the responses include providing an corresponding instruction to Dispatcher 158 or a requested memory operation via Storage Access Methods 160.

When a memory operation is required, Storage Access Methods 160 requests the operation from Main Storage and Locks 168. Dispatcher 158 preserves its real time processing native environment as shown by Real Time Clock 166 and Events 164. Such indications are communicated to Dispatcher 158 as shown.

Figure 7:
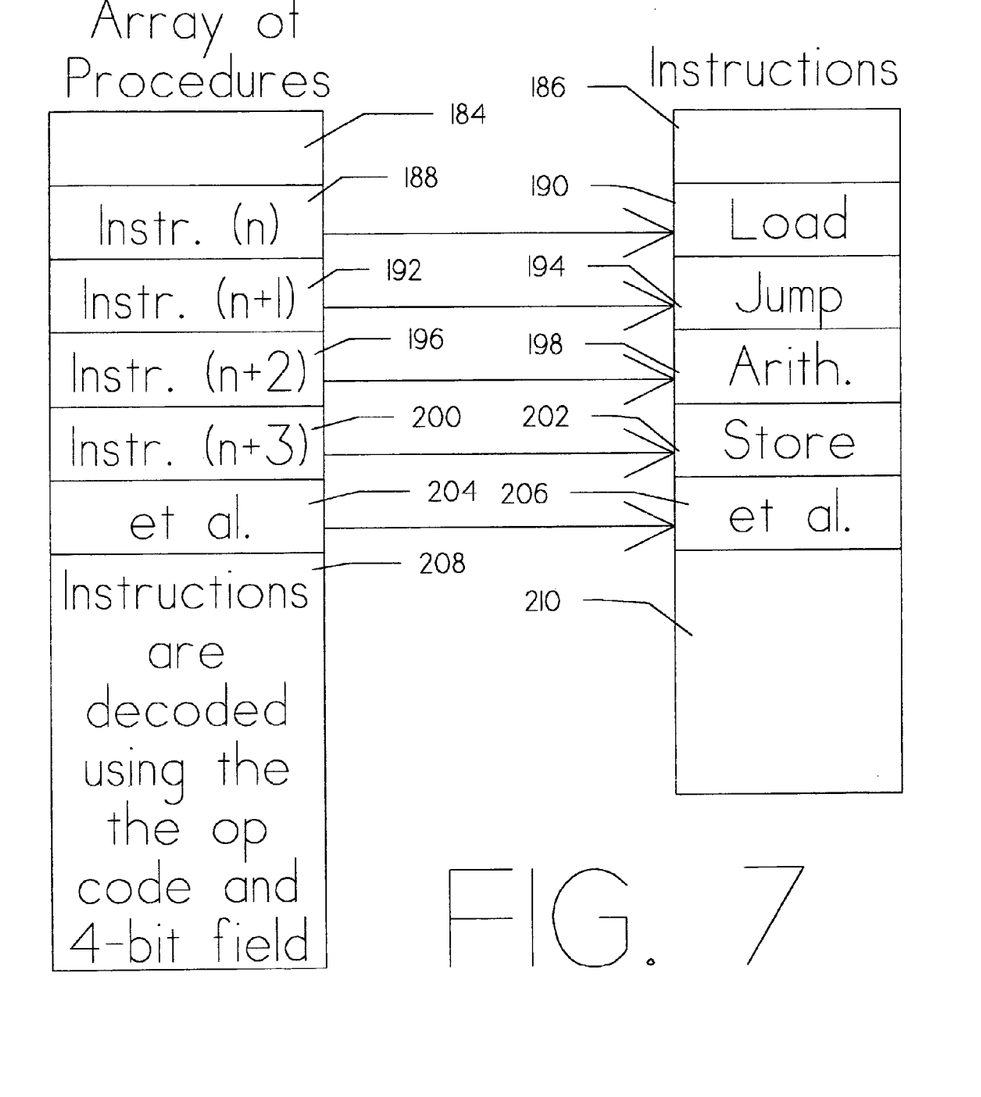
FIG. 7 is a detailed diagram showing linking of the host and target instructions in accordance with the present invention.

FIG. 7 is a detailed diagram showing how the array of procedures 184 points directly to the corresponding instructions 186. The instructions are decoded using the op code and a 4-bit field. These two fields are combined to point directly to the appropriate one of instructions 186.

For example, Instr. (N) 188 is decoded to point to Load 190, and Instr. (N+1) 192 is decoded to point to Jump 194. Similarly, Instr. (N+2) is decoded to point to Arithmetic 198, and Instr. (N+3) 200 is decoded to point to Store 202. Additional instructions 204 are decoded to point to their corresponding instructions 206.

Figure 8:
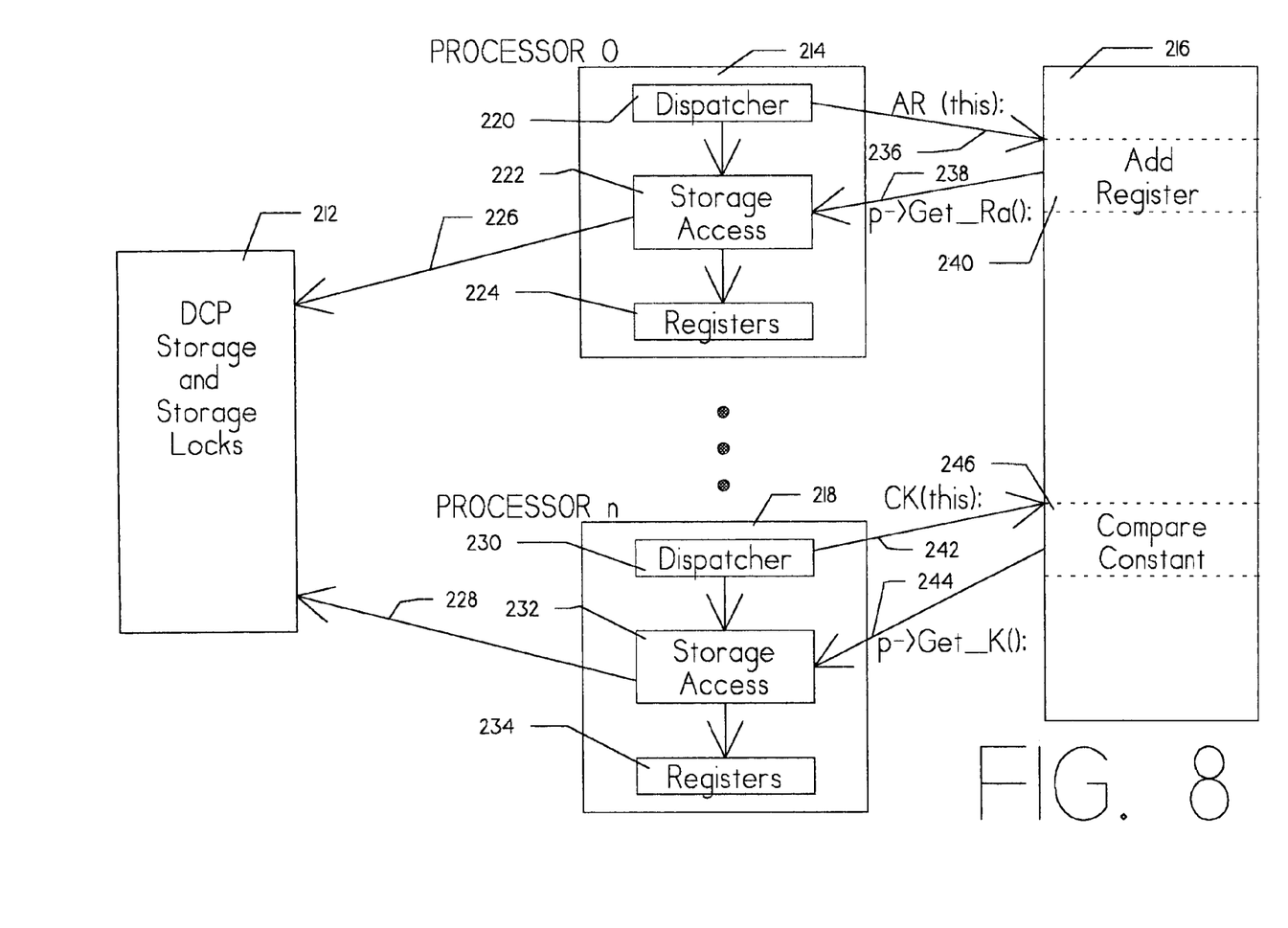
FIG. 8 is detailed diagram showing operation of a multiprocessor system.

FIG. 8 is a detailed diagram showing emulation of a multiprocessor DCP configuration, which incorporates the preferred mode of the present invention. Even in a multiprocessor host configuration, a single host processor may be utilized to emulate multiple target processors. In this embodiment, a plurality of application processors, including Processor 0 214 through Processor n 218, are defined. Each of the processors operates as previously discussed (see also FIGS. 6 and 7). Thus, Processor 0 214 has a Dispatcher 220, Storage Access 22, and Registers 224. Similarly, Processor n 218 has a Dispatcher 230, Storage Access 232, and Registers 234. DCP Storage and Storage Locks 212 operates as previously described for single processor emulation. Instructions 216 are as previously described.

In a typical example, Dispatcher 220 of Processor 0 214 combines an op code and corresponding four bit field producing an index to uniquely specify Add Register 240. Access 236 is made to Add Register 240. In response Request 238 to access the necessary data is made to Storage Access 222 which in turn formats Request 226 to DCP Storage and Storage Locks 212.

In a second example, Dispatcher 230 of Processor n 218 combines an op code and corresponding four bit field which uniquely identifies Compare Constant 246. Access 242 transfers the index to Instructions 216 and Compare Constant 246 is accessed. Request 244 is made of Storage Access 232, which in turn formulates Request 228 for accessing DCP Storage and Storage Locks 212.

Figure 9:
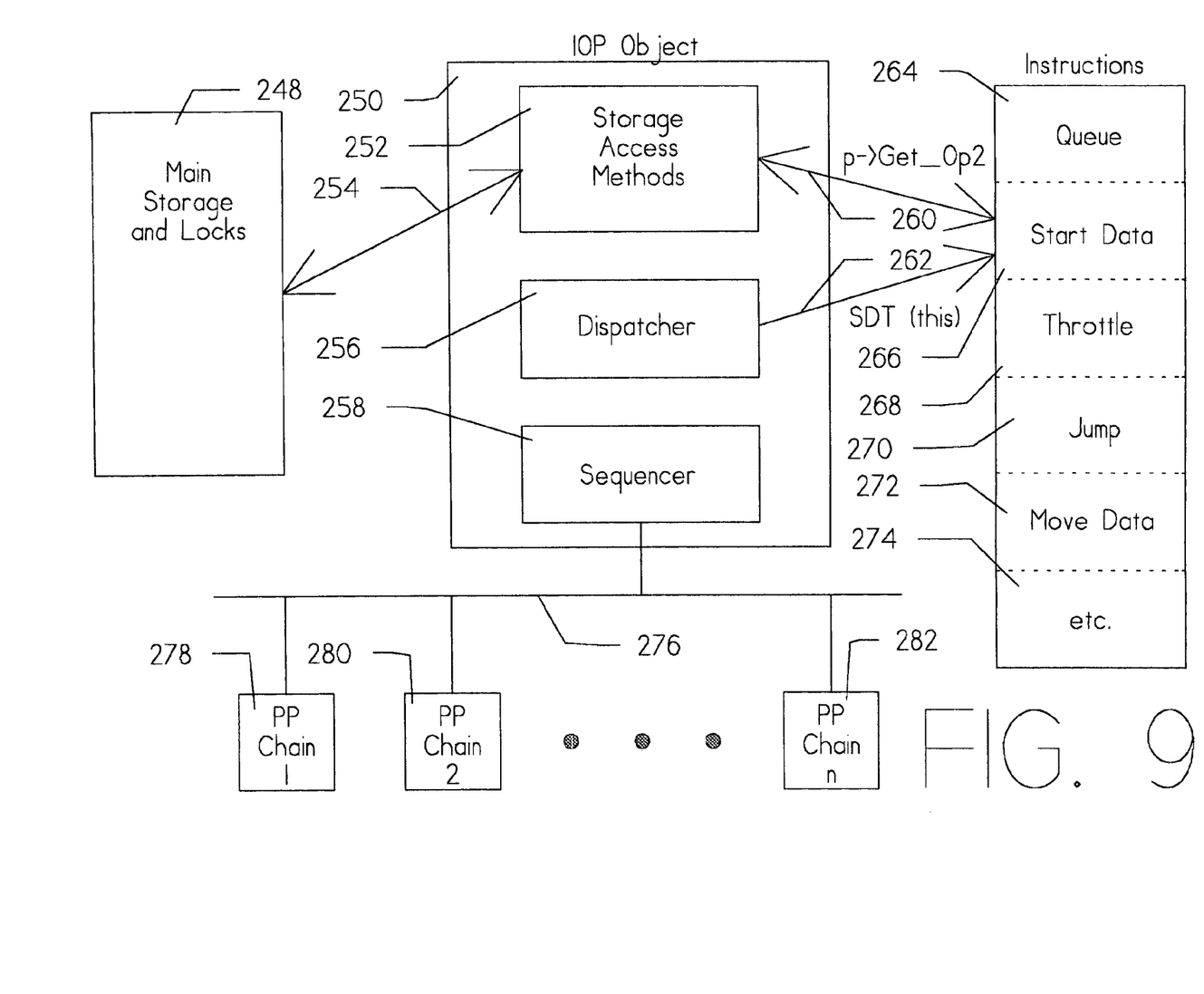
FIG. 9 is a detailed diagram showing I/O operations.

FIG. 9 is a detailed diagram showing operation of an emulated input/output instruction. This operates similar to emulation of communications processor instructions. IOP Object 250 contains three major components. Dispatcher 256 and Storage Access Methods 252 operate similar to the corresponding components in the communications processor applications (see also FIGS. 6 and 7). Sequencer 258 operates to sequence transmissions which are often handled in specialized hardware in the target machine. These operations include sequencing block transmissions, managing serial transmissions, etc. Sequencer 258 drives applications for individual input/output channels including PP Chain 1 278, PP Chain 2 280, and PP Chain n 282 via path 276.

Main Storage and Locks 248 operates as previously described. Instructions 274 are specialized input/output instructions. These include, Queue 264, Start Data 266, Throttle 268, Jump 270, and Move Data 272.

In the present example, Dispatcher 256 combines the present op code and corresponding four bit field to produce an index to uniquely address Start Data 266. The access is made via path 262. In response, Start Data 266 communicates with Storage Access Methods 252 to make the necessary memory accesses via path 260. Storage Access Methods 252 makes the memory accesses via path 254 coupled to Main Storage and Locks 248.

Having thus described the preferred embodiments of the present invention, those of skill in the art will readily appreciate that the teachings found herein may be applied to yet other embodiments within the scope of the claims hereto attached.

What is claimed is:

1. In a data processing system having a first processor with a first software architecture, the improvement comprising:
   a. a plurality of emulation objects each executable by said first processor wherein each of said emulation objects emulates operation of a different one of a plurality of target processors each of said plurality of target processors having a plurality of specialized communication instructions wherein each of said plurality of target processors has a software architecture different from said first software architecture.

2. An improvement according to claim 1 wherein each of said emulation object is compatible with said first software architecture.

3. An improvement according to claim 2 wherein at least one of said plurality of emulation objects further comprises an array of procedures compatible with said first software architecture and a list of instructions compatible with a second software architecture.

4. In a data processing system having a first processor with a first software architecture, the improvement comprising:
   a. a plurality of emulation objects each executable by said first processor wherein each of said emulation objects emulates operation of a different one of a plurality of target processors wherein each of said plurality of target processors has a software architecture different from said first software architecture;
   b. wherein each of said emulation object is compatible with said first software architecture;
   c. wherein at least one of said plurality of emulation objects further comprises an array of procedures compatible with said first software architecture and a list of instructions compatible with a second software architecture; and
   d. wherein said list of instructions includes specialized instructions for communications processing.

5. An improvement according to claim 4 wherein each of said array of procedures corresponds to a one of said list of instructions through the use of an operation code and corresponding four bit field.

6. An apparatus comprising:
   a. a first instruction processor having a first software architecture; and
   b. a plurality of emulation objects responsively coupled to said first instruction processor wherein each of said plurality of emulation objects permits said first instruction processor to emulate a different one of a plurality of target processors and wherein each of said plurality of target processors has a software architecture different from said first software architecture and wherein said different software architecture includes at least one specialized communication instruction.

7. An apparatus according to claim 6 further comprising a first computer program having a first plurality of instructions which are compatible with said first software architecture.

8. An apparatus comprising:
   a. a first instruction processor having a first software architecture;
   b. a plurality of emulation objects responsively coupled to said first instruction processor wherein each of said plurality of emulation objects permits said first instruction processor to emulate a different one of a plurality of target processors and wherein each of said plurality of target processors has a software architecture different from said first software architecture;
   c. a first computer program having a first plurality of instructions which are compatible with said first software architecture; and
   d. wherein said first plurality of instructions further comprises a specialized communication instruction.

9. An apparatus according to claim 8 wherein a first one of said emulation objects further comprises an array of procedures and a list of instructions.

10. An apparatus according to claim 9 wherein each of said procedures of said array of procedures is directly linked to a different one of said list of instructions.

11. A method of emulating a plurality of target processors by a first processor having a first software architecture incompatible with the software architectures of said plurality of target processors, the method comprising:
   a. executing a first emulation object corresponding to a first of said plurality of target processors;
   b. executing another emulation object corresponding to another of said plurality of target processors; and
   c. wherein said first emulation object further comprises a specialized instruction.

12. A method of emulating a plurality of target processors by a first processor having a first software architecture incompatible with the software architectures of said plurality of target processors, the method comprising:
   a. executing a first emulation object corresponding to a first of said plurality of target processors;
   b. executing another emulation object corresponding to another of said plurality of target processors;
   c. repeating step b for each of said plurality of target processors; and
   d. wherein said first emulation object further comprises a specialized instruction.

13. A method according to claim 12 wherein said specialized instruction further comprises an instruction for communication processing.

14. A method according to claim 12 wherein said first emulation object further comprises an array of procedures.

15. An apparatus comprising:
   a. a first instruction processor which executes a first sequence of instructions in accordance with a first software architecture;
   b. a second sequence of instructions in accordance with a second software architecture which is incompatible with said first software architecture and wherein one of said second sequence of instructions further comprises an instruction for communications processing;
   c. a plurality of emulation objects wherein a first of said plurality of emulation objects corresponds to said second software architecture;
   d. a plurality of sequences of target instructions in accordance with said first software architecture located within said first of said plurality of emulation objects wherein said one of said second sequence of instructions corresponds to one of said plurality of sequences of target instructions; and
   e. a selection facility which selects said one of said plurality of sequences of target instructions for presentation to said first instruction processor for execution.

16. An apparatus according to claim 14 wherein said selection facility utilizes a portion of said one of said second sequence of instructions to select said one of said plurality of sequences of target instructions.

17. An apparatus according to claim 16 wherein said portion further comprises an op code.

18. An apparatus comprising:
   a. a first instruction processor which executes a first sequence of instructions in accordance with a first software architecture;
   b. a second sequence of instructions in accordance with a second software architecture which is incompatible with said first software architecture;
   c. a plurality of emulation objects wherein a first of said plurality of emulation objects corresponds to said second software architecture;
   d. a plurality of sequences of target instructions in accordance with said first software architecture located within said first of said plurality of emulation objects wherein one of said second sequence of instructions corresponds to one of said plurality of sequences of target instructions;

c. a selection facility which selects said one of said plurality of sequences of target instructions for presentation to said first instruction processor for execution;
d. wherein said selection facility utilizes a portion of said one of said second sequence of instructions to select said one of said plurality of sequences of target instructions;
c. wherein said portion further comprises an op code;
e. wherein said op code points to said one of said plurality of sequences of target instructions; and
f. wherein said one of said second sequence of instructions further comprises an instruction for communications processing.

\* \* \* \* \*

UNITED STATES PATENT AND TRADEMARK OFFICE
CERTIFICATE OF CORRECTION

PATENT NO. : 6,978,233 B1 Page 1 of 1
DATED : December 20, 2005
INVENTOR(S) : Lee B. Hansen et al.

It is certified that error appears in the above-identified patent and that said Letters Patent is hereby corrected as shown below:

<u>Column 8,</u>
Line 20, the term "12" should read -- 13 --.
Line 43, the term "14" should read -- 15 --.

Signed and Sealed this

Twenty-eighth Day of March, 2006

JON W. DUDAS
*Director of the United States Patent and Trademark Office*